(12) United States Patent
Barral et al.

(10) Patent No.: US 12,410,948 B2
(45) Date of Patent: Sep. 9, 2025

(54) METHOD FOR MODELLING A GEOTHERMAL INSTALLATION FOR THE THERMAL REGULATION OF AT LEAST ONE BUILDING

(71) Applicant: CONSTANCE ENERGY SAS, L'haÿ-les-Roses (FR)

(72) Inventors: Quentin Barral, Issy-les-Moulineaux (FR); Alice Chougnet, L'haÿ-les-Roses (FR)

(73) Assignee: CONSTANCE ENERGY SAS, L'Hay-les-Roses (FR)

( * ) Notice: Subject to any disclaimer, the term of this patent is extended or adjusted under 35 U.S.C. 154(b) by 818 days.

(21) Appl. No.: 17/642,537

(22) PCT Filed: Sep. 10, 2020

(86) PCT No.: PCT/FR2020/051563
§ 371 (c)(1),
(2) Date: Mar. 11, 2022

(87) PCT Pub. No.: WO2021/048501
PCT Pub. Date: Mar. 18, 2021

(65) Prior Publication Data
US 2022/0325920 A1    Oct. 13, 2022

(30) Foreign Application Priority Data
Sep. 11, 2019 (FR) ...................................... 1910018

(51) Int. Cl.
*F24T 10/13*   (2018.01)
*F24T 10/20*   (2018.01)
*F24T 10/00*   (2018.01)

(52) U.S. Cl.
CPC .............. *F24T 10/13* (2018.05); *F24T 10/20* (2018.05); *F24T 2010/56* (2018.05); *F24T 2201/00* (2018.05)

(58) Field of Classification Search
CPC ....... F24T 10/13; F24T 10/20; F24T 2010/56; F24T 2201/00
See application file for complete search history.

(56) References Cited

U.S. PATENT DOCUMENTS

| 2011/0166718 A1* | 7/2011 | Van Bael | F28D 20/0052 700/287 |
| 2011/0224942 A1* | 9/2011 | Kidwell | G01K 17/00 702/182 |

(Continued)

FOREIGN PATENT DOCUMENTS

| DE | 102012002028 B4 * | 1/2015 | ............... F24T 10/00 |
| DE | 102016015503 A1 * | 6/2018 | ........... F24D 11/0221 |

(Continued)

OTHER PUBLICATIONS

DE102016015503A1 mt (Year: 2018).*

(Continued)

*Primary Examiner* — Gordon A Jones
(74) *Attorney, Agent, or Firm* — MARSHALL, GERSTEIN & BORUN LLP

(57) ABSTRACT

The invention relates to a method for sizing a geothermal well for the thermal regulation of a building, including the steps of: —51: Modelling a geothermal potential of a zone of interest including a subsoil zone comprised within a given perimeter around the building; —S2: Estimating the thermal requirements of the building; —S3: Generating models of geothermal installations according to the results of 51 and S2, a model of a geothermal installation including one or more geothermal solutions configured to meet the requirements estimated in step S2 according to the zone of interest (Continued)

modelled in step 51; —S4: Applying a selection criterion which is configured to determine a preferred model.

13 Claims, 2 Drawing Sheets

(56) References Cited

U.S. PATENT DOCUMENTS

| | | | |
|---|---|---|---|
| 2012/0059632 A1* | 3/2012 | Hagedorn | F24T 10/13 703/2 |
| 2012/0090807 A1* | 4/2012 | Stewart | F24T 10/40 165/45 |
| 2015/0122453 A1* | 5/2015 | Colwell | F24T 10/20 165/45 |
| 2017/0087607 A1* | 3/2017 | Carey | F24T 10/17 |
| 2019/0154288 A1 | 5/2019 | Adirim | |
| 2021/0231109 A1* | 7/2021 | Toews | F24T 10/10 |
| 2023/0304702 A1* | 9/2023 | Tremolieres | F24D 11/0221 |
| 2024/0085065 A1* | 3/2024 | Crossley | B01D 19/0068 |
| 2024/0369264 A1* | 11/2024 | Strange | F24T 10/20 |

FOREIGN PATENT DOCUMENTS

| | | | | |
|---|---|---|---|---|
| WO | WO-0215365 A2 * | 2/2002 | | H02J 3/00 |
| WO | WO-2012/061929 A1 | 5/2012 | | |
| WO | WO-2018/048432 A1 | 3/2018 | | |

OTHER PUBLICATIONS

DE102012002028B4 mt (Year: 2015).*
Ondreka et al: "GIS-supported mapping of shallow geothermal potential of representative areas in south-western Germany-Possibilities and limitations", Renewable Energy, Pergamon Press, Oxford, GB, vol. 32, No. 13, Mar. 30, 2007, pp. 2186-2200.
Santilano Alessandro et al: "An integrated 3D approach to assess the geothermal heat-exchange potential: The case study of western Sicily (southern Italy)", Renewable Energy, vol. 97, Jun. 15, 2016, pp. 611-624.
Kaufmann et al: "3D geological modelling from boreholes, cross-sections and geological maps, application over former natural gas storages in coal mines", Computers and Geosciences, Pergamon Press, Oxford, GB, vol. 34, No. 3, Dec. 12, 2007, pp. 1-9.
Stylianou Iosifina Iosif et al: "Methodology for estimating the ground heat absorption rate of Ground Heat Exchangers", Energy, Elsevier, Amsterdam, NL, vol. 127, Mar. 29, 2017, pp. 258-270.
Mirmahdi Seyedrahimi-Niaraq et al: "Development of an updated geothermal reservoir conceptual model for NW Sabalan geothermal field, Iran", Geothermal Energy, Biomed Central Ltd, London, UK, vol. 5, No. 1, Aug. 9, 2017, pp. 1-22.
French Search Report; FR App No. 1910018 issued May 1, 2020.
International Search Report; App. No. PCT/FR2020/051563 issued Nov. 11, 2020.

* cited by examiner

[Fig. 1]
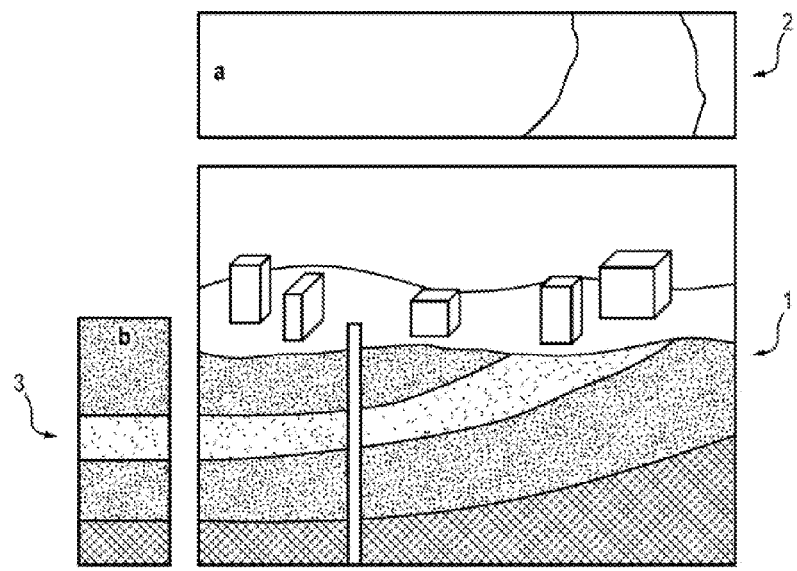
[Fig. 2]
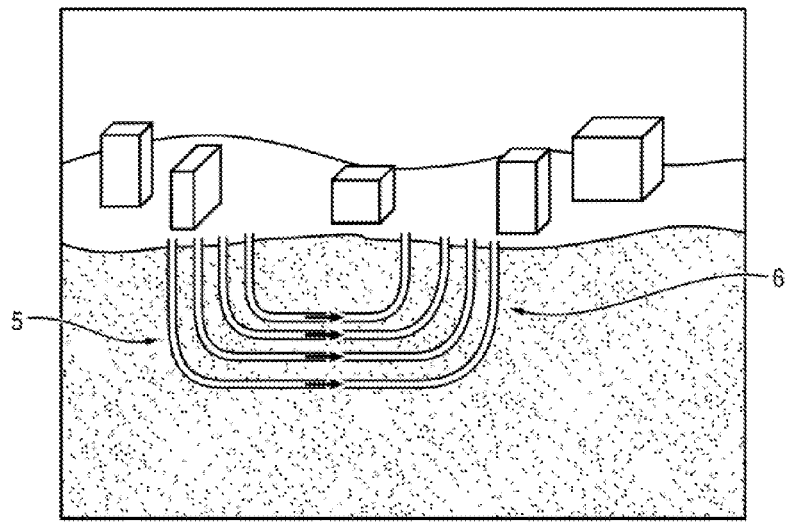

[Fig. 3]
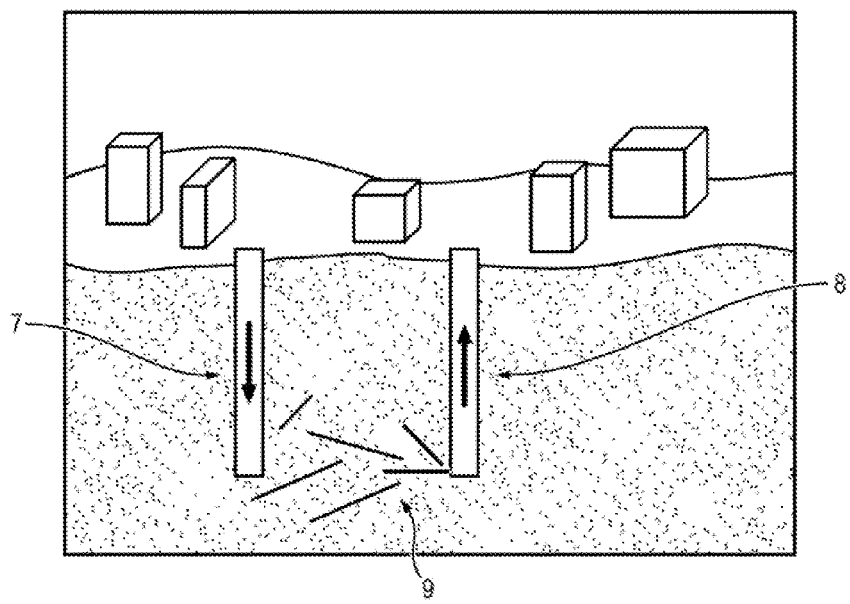
[Fig. 4]
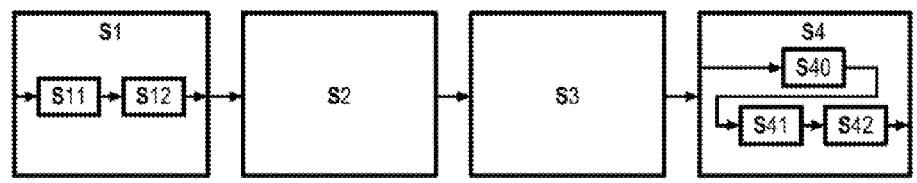

METHOD FOR MODELLING A GEOTHERMAL INSTALLATION FOR THE THERMAL REGULATION OF AT LEAST ONE BUILDING

CROSS-REFERENCE TO RELATED APPLICATIONS

This application is a U.S. National stage of International Patent Application No. PCT/FR2020/051563 filed Sep. 10, 2020, which claims the benefit of priority of French Patent Application No. 1910018 filed Sep. 11, 2019, the respective disclosures of which are each incorporated herein by reference in their entireties.

BACKGROUND

The invention relates to the general field of geothermal systems, and more specifically to the methods for drilling and installing such systems.

Before considering geothermal energy work with the aim of installing a geothermal energy well for the thermal comfort and the energy efficiency of a building, a client typically performs a feasibility and geothermal potential study on an area of interest located in the vicinity of the building by a subsoil specialist.

Today, this study is conducted with an empirical approach, relying mainly on existing neighboring installations or on a brief knowledge of the subsoil. Indeed, the mapping of subsoils requires rare and expensive skills, so such an operation is not systematic in areas that are not intended to be exploited.

Two main types of geothermal installations are conventionally distinguished.

Geothermal energy on groundwater, or aquifer, consists in pumping water from a groundwater through one or several drillings to convey it to a heat pump in order to draw energy therefrom or accumulate energy therein via a heat exchanger, so as to heat or cool the building. The water is then re-injected into the aquifer through a second or more drillings.

When there is no groundwater in the vicinity of the area of interest, it is known to make the installation of the geothermal probes. A geothermal probe is a heat exchanger made up of tubes buried vertically in a drilling of several tens of meters deep and in which a heat transfer fluid which draws heat or coolness from the surrounding soil flows.

In the case of geothermal energy on groundwater, the study of the potential of the subsoil of an area of interest consists in recovering the capacities of the neighboring geothermal wells and making an average weighted by the distance to the area of interest.

In the case of vertical geothermal probes, an estimate of the thermal conductivity is given according to the location of the area of interest.

Several problems arise from this specific lack of upstream analysis of the geothermal potential. The geothermal systems installed are not dimensioned with accuracy, the heating power that they are able to transfer being estimated with a significant limit of error.

The lack of knowledge of the subsoil implies that the power available by heat transfer with the subsoil is not known a priori.

The geothermal energy solution therefore inspires little confidence among clients and thermal research departments. The type of installation proposed is not optimal with regard to the needs of the building, and very often comes down to a copy of a previous project while it should be specific. The costs directly related to the installation are not optimized because the solutions are not designed according to the thermal potential of the soil.

The low levels of accuracy in soil modeling limit the needs for optimization and dimensioning of the geothermal systems, which hinders the innovation in the surface geothermal energy. Access to the resource is therefore degraded: vertical drillings do not always allow achieving sufficient powers for large buildings, which means that geothermal energy is excluded from the potential sources of energy for such projects.

Due to the lack of knowledge of subsoils, some geographical areas can be equipped with too many or too few geothermal installations.

If too many geothermal installations are installed on one area, the individual efficiency of the installations is reduced, so that the cumulative potential of the installations of this area is lower than the available geothermal potential.

If too few geothermal installations are installed on one area, the cumulative potential of the installations is lower than the available geothermal potential.

The cumulative capacity of geothermal installations is thus necessarily lower than what it could be with optimal management of the resource.

A method for making a geothermal installation is already known from the application WO2018/048432, in which a very brief modeling is implemented from the geographical data corresponding to the location of the building, as well as characteristics of the geothermal probe.

One aim of the invention is to propose a preferential installation adapted to the building and the subsoil.

Another aim is to improve the reliability and accuracy of the methods for estimating the geothermal potential of the soil of an area.

Another aim is also to allow better dimensioning of the geothermal energy systems.

A method for assisting in making a geothermal installation comprising a geothermal probe coupled with a heat pump is also known from the article "GIS-supported mapping of shallow geothermal potential of representative areas in south-western Germany—possibilities and limitations"—Ondreka et al.—October 2007—Renewable Energy 32(13): 2186-2200.

Such a method however does not allow generating several modelings or selecting a preferential installation.

SUMMARY

According to one aspect, the invention proposes a method for modeling a geothermal installation for the thermal regulation of at least one building, in which the following steps are implemented:

S1: Modeling of a geothermal potential of one area of interest comprising a subsoil area comprised in a given perimeter around the building;

S2: Estimation of the thermal needs of the building so as to identify a dimensioning parameter representing the maximum value of the required power to maintain the building to its heating or cooling setpoint temperature; (this maximum value is indeed one of the main elements that allow dimensioning the geothermal installation);

S3: Generation of a plurality of models of geothermal installations according to the results of S1 and S2, a model of geothermal installation comprising one or several geothermal solutions configured so as to meet the needs estimated in step S2 according to the area of interest modeled in step S1;

S4: Application of a selection criterion configured to determine a preferential model, step S4 comprising a step of calculating a complexity index S41 associated with each of the modeled installations, and a ranking step S42 configured to classify the modeled installations according to their respective complexity index;

wherein step S1 is carried out so as to obtain a three-dimensional geological map of the geological nature of the subsoil by executing the following sub-steps:

S11: Interpolation of a geological surface map with geological cross-sections performed occasionally, so as to statistically associate a subsoil profile with a type of geological surface;

S12: Modeling of the subsoil in a given perimeter around the building according to the surface, from the statistical associations obtained in step S11.

The model thus selected is intended to be used where appropriate for making a geothermal installation.

Advantageously, the invention is completed by the following characteristics, taken alone or in combination:

step S2 is configured to generate a plurality of models of the building, each of the models integrating modifications so as to simulate the effect of renovation work on the building, a dimensioning parameter representing the theoretical need then being identified for each of the previously generated models of the building; this allows simulating geothermal solutions integrating work to the building, thus making it possible to minimize the complexity of the work to be performed for the geothermal solution;

step S3 is configured to generate models of geothermal installations including one or several geothermal solutions, the geothermal solutions being chosen according to the nature of the subsoil of the area of interest modeled in step S1; this allows generating only models of solutions adapted to the nature of the soil, which allows limiting the calculation time and the calculation power necessary for step S3;

the models of geothermal installations include a maximum of three geothermal solutions; this allows limiting the calculation power necessary for step S3, and limiting the calculation time of step S3;

the geothermal solutions are chosen, for a dry soil, among vertical probes, deviated probes, optimized probes, a solution with fractured rock including an injection well, a production well and a fracture network including a plurality of openings and faults that allow establishing fluid communication between the injection well and the production well, and for a moist soil, among a solution with vertical, deviated or optimized probes, a solution with well on groundwater, a solution with deviated well on groundwater;

the modeled geothermal installations are dimensioned such that the drilling length of each modeled installation allows producing the required power according to the geothermal potential of the subsoil modeled in step S1;

step S4 includes an evaluation step S40, during which each modeled installation is evaluated and considered as feasible or excluded, any excluded installation being removed from the potentially achievable models;

step S40 is carried out before steps S41 and S42; this allows limiting the calculation necessary to carry out steps S41 and S42;

a complexity index can for example be a multi-criteria index;

a complexity index can be composed of a part independent of the duration of use, taking into account the installation and the end of life of the geothermal installation and of the building, as well as a part independent of the duration of use.

the modeling is re-evaluated later by implementing a method according to all or part of the previous steps.

The invention also relates to a method for making a geothermal installation, in which the geothermal installation is made according to a determined model selected by implementing a method according to any of the preceding claims.

According to another aspect, the invention proposes a computer program product including code instructions for implementing steps of the method according to the invention when said program is executed on a computer.

DESCRIPTION OF THE DRAWINGS

Other characteristics and advantages of the invention will emerge from the following description, which is purely illustrative and not limiting, and should be read in relation to the appended figures in which:

FIG. 1 is a schematic representation of the components useful for the 3D modeling of the subsoil of an area of interest in a method according to the invention;

FIG. 2 is a schematic representation of a geothermal installation with optimized probes;

FIG. 3 is a schematic representation of a fractured rock geothermal installation;

FIG. 4 is a schematic representation of a method according to the invention.

DETAILED DESCRIPTION

Generalities

The proposed method allows designing the wellbores of a geothermal installation for the thermal comfort and the energy efficiency of at least one building for the dimensioning of a geothermal well for a building.

It comprises the steps of:

S1: Modeling of the geothermal potential of a subsoil area in the vicinity of the building;

S2: Estimation of the thermal needs of the building;

S3: Generation of models of geothermal installations according to the results of S1 and S2;

S4: Determination of a preferential model by applying a selection criterion.

This succession of steps allows estimating with accuracy the thermal potential of the subsoil of the plot on which the geothermal well is going to be installed, so as to dimension and choose the installation which will allow best exploiting this potential according to the optimized needs of the building.

An adapted installation is therefore proposed according to the building and the subsoil, which allows optimizing the thermal efficiency, the cost and the profitability of the geothermal installation.

Such a method is advantageously carried out in an automated manner by means of a computing unit implementing a program including code data stored in one or several memory units. When the code data are implemented by a computing unit, for example a processor, this generates a succession of instructions that allow carrying out the method for dimensioning a geothermal well.

It should further be noted that for a given building, it is possible that during exploitation the underground conditions change (in particular due to the densification of the installations; modifications in the flow rate for shallow groundwater, due to climate imbalance, may also be envisaged). A modeling re-evaluation can then be implemented.

This re-evaluation can be implemented by providing the algorithm with new data, typically public data such as: presence of new installations, depth of the resource, new boreholes, flow rate measurements, pressure, pressure temperature, etc.

It is intended to be used to develop the building and/or the geothermal installation.

Modeling of the Geothermal Potential

During step S1, a sub-step of structurally modeling S11 the subsoil of the area of interest is carried out, so as to model and estimate the thermal characteristics of the soil with accuracy.

The modeling is carried out using the structural knowledge of the subsoil, obtained by crossing surface geological maps with vertical logs obtained occasionally at the existing wells, as represented in FIG. 1.

Surface geological maps can be made on site or by exploiting data previously made by an organization. It is conventionally understood by geological map a representation of the geological rocks and structures, present at the outcrop or in the subsurface of a region.

Vertical logs are conventionally made during deep drillings, for example during drillings deeper than 10 m, so as to provide information on the quality of the subsoil and the possible resources present in the subsoil. It is conventionally understood by log a recording, according to the depth, of a characteristic of a geological formation traversed by a borehole.

A three-dimensional map 1 of the geological nature of the subsoil is established by geostatistical extrapolation between the outcropping (surface) geological maps 2 and the point data of layers 3 traversed by the wells.

For each type of surface geology at an existing geothermal well, the structure of the subsoil is known thanks to the work carried out and to the readings taken after the drillings necessary for the construction of the geothermal installations. A probabilistic model is used so as to attribute probable subsoil depending on the nature of the surface geology, for each point on the surface of the area of interest.

A probable model of the subsoil of the area of interest is then reconstituted by extrapolation of the point-by-point simulations.

Physical values of porosity and permeability are attributed to the soil layers thus modeled using measurements made on core samples or using water pumping test data (Jacob's method) from existing wells.

In the case of reservoir rocks with homogeneous permeability, a detailed analysis of the pumping tests allows removing the contribution to the flow dynamics of the reservoir water of the well itself from that of the traversed rock, thus obtaining the intrinsic values of the reservoir. Indeed, the results of the approximation of the experimental values to the formula proposed by Theis in "*A generalized graphical method for evaluating formation constants and summarizing well field history*", Am. Geophys. Union Trans., vol. 27, 1935 generally reveals two behaviors: over short periods (up to 5 minutes of release after pumping), the characteristics of the well are measured; over long periods of time, access to the water far from the well becomes critical and it is the intrinsic value of the rock that is then measured. A water pumping measurement on an existing well is specific to this well and may be different from a neighboring well reaching however the same rocks. This is because the capacities of the well depend on two differentiated phenomena:

The ease with which water moves through the rock itself of the reservoir, depending on intrinsic parameters of the reservoir rock such as the porosity and permeability of the rocks;

The ease with which water can pass through the various elements of the well, installed by man, namely the gravel pack and the strainer.

Starting from the geological model of the subsoil, and taking into account the physical parameters of the rocks making up the subsoil, for example the porosity and the permeability, a sub-step of geothermal simulation S12 of the modeled subsoil is carried out.

If the modeled subsoil includes a groundwater, step S12 simulates the flow of water in the subsoil, by applying Darcy's law. This law expresses the flow rate of water in a porous rock. The coefficient of proportionality, called permeability, depends on the structure of the rock. This allows calculating the ease with which water contained in the phreatic groundwater reaches the production well. The subsoil is also thermally modeled by means of well-known methodologies, the thermal properties of the solids and fluids present are described through their heat capacity, their thermal conductivity as well as the convection speeds.

In case of absence of groundwater, a heat capacity and a thermal conductivity are attributed to the different rocks encountered. Step S12 simulates the diffusion of heat in the subsoil and allows evaluating the power which could be exchanged with the subsoil through a tube containing the heat transfer fluid leaving the heat pump. The seasonality of the building's needs induces a cycle of the phases of storing and retrieving heat in the subsoil, making it possible in some cases to increase the available power.

The flow simulation step S12 allows deducing the water flow rate values in the area of interest, the thermal capacities of a well drilled at this place and the influence of a well on the state and pressure of the groundwater if there is a groundwater in the vicinity of the area of interest (drawdown curve).

Advantageously, each well installed in the surroundings is integrated into the subsoil model and its interaction area is calculated according to its operating flow rate. Thus, the influence of the surrounding wells on the reservoir is taken into account by the calculation of the drawdown and the temperature variation in the groundwater. This allows maximum use of the resource without degrading it or disturbing the neighboring wells (the drawdown volumes should not overlap).

Estimation of the Thermal Needs of the Building

The heating and/or cooling power requirements of the building are estimated during step S2 by modeling the building according to at least one of the following parameters, or a combination of them:

the level of insulation of the opaque and glazed walls,
sun exposure,
the use,
the number of users, and
the internal contributions.

The estimate of the power requirements is then dimensioned for an equal temperature gradient:

For a heating requirement, at the minimum outdoor temperature recorded in the area of interest (or −7° C. by default) and the winter setpoint temperature (or by default 19° C.);

For a cooling requirement, at the maximum outdoor temperature recorded in the area of interest (or 30° C. by default) and the summer setpoint temperature (or by default 23° C.).

It is understood by setpoint temperature the temperature desired for the interior of the building.

The glazed and opaque walls, and in particular the thermal resistance values attributed to the walls, are modeled according to the data provided by the owner of the building, or otherwise, according to the year of construction and last renovation of the building.

For the opaque walls, this value takes into account the conduction of the material and the convection of the air close to the walls.

For the glazed walls, a thermal performance coefficient value is attributed according to the year of renovation.

The instantaneous required power to maintain the setpoint temperature in the building and therefore balance the losses due to the temperature difference between the interior and the exterior is equal to the surface of the considered wall multiplied by the temperature deviation between the two sides of the wall divided by the thermal resistance defined previously.

Preferably, during step S2, a dimensioning parameter representing the maximum required power Pbat to maintain the building to its heating or cooling setpoint temperature is identified. Pbat represents the most important thermal power that will be requested from the geothermal installation whatever the situation encountered.

This allows obtaining initial needs without modifying the building.

Optionally, several thermal renovation solutions i for the building are theoretically envisaged, by improving its thermal insulation and/or its emission system(s) (radiators, heated floors, etc.). For each of the solutions, the theoretical insulated building is modeled and its needs and consumptions are estimated, so as to deduce a theoretical required power Pth(i), i.e. the theoretical need Pth(i) necessary for the thermal regulation of the model of renovated building. Each renovation model is therefore associated with a theoretical need Pth(i).

The thermal renovations can consist of adding layers of insulating materials inside or outside the building, changing the windows, modifying the ventilation system, adding solar breezes on the openings, planting trees judiciously chosen around the building (conifers on the northern facades and leafy trees on the southern facades), painting the external surfaces in light colors, . . .

A plurality of models of the building each integrating a thermal renovation or a combination of several types of renovations are therefore generated and their thermal performances are simulated, which allows estimating the theoretical needs Pth(i) of each of the renovated building models.

These needs are then transcribed into powers to be taken from the subsoil, taking into account the contribution of the heat pump and imposing a performance coefficient η for the installation. The performance coefficient η can be comprised between 2 and 6, preferably between 3 and 5, for example 4.

An energy calculation is performed by taking over a full year the outdoor temperature, the setpoint temperature and the internal contributions (users of the buildings and electricity consumption of the equipment) and by summing the consumption in hourly steps.

Generation of Models of Geothermal Installations

During step S3, different geothermal installations are modeled and integrated into the model, each of the modeled geothermal installations being dimensioned in such a way as to meet the needs of the building estimated during step S2 according to the thermal potential of the subsoil of the area of interest estimated during step S1.

The installations can therefore advantageously be modeled for each of the theoretical required powers Pth(i) associated with the renovated or non-renovated building models.

The modeled installations may comprise one or several different types of geothermal solutions.

The different types of geothermal solutions are classified into two categories, depending on whether or not there is phreatic groundwater in the area of interest.

Case of a "Dry" Rock (without Phreatic Groundwater)

One solution uses vertical probes, i.e. vertical wells equipped with a U-shaped tube in which a heat transfer fluid goes up and then down in the same well. It is necessary to take into account a spacing of 10 m between each probe approximately. The footprint must therefore be substantial to envisage such a solution.

A solution using deviated probes can be modeled. Indeed, if the U-shaped tubes are installed in deviated wells, this allows a greater heat exchange in the superficial areas while maintaining a small footprint. Conventionally, a well is vertical: gravity pulls the drill head downwards, it simply needs to be rotated to go deep into the ground. A deviated well is a well whose axis deviates from the vertical axis. The main interest is that the areas of interest are generally horizontal layers and that the well will have an influence on an area close to its walls (10 to a few tens of meters). By having a deviated (or horizontal) well, the contact surface with the area of interest is increased while having only a restricted drilling area on the surface.

It is meant by superficial area geothermal energy of minimal depth, legally defined as a subsoil area comprised between a first depth and a second depth which are defined by local law, for example between 10 m and 200 m in France. Such a type of geothermal energy is configured to exploit subsoil areas with a constant temperature throughout the year, typically between 10° C. and 20° C., preferably between 12° C. and 15° C. The temperature of the subsoil increases with the depth, the temperatures reached from a certain depth are not relevant for the application of the installations.

A solution using optimized probes can be modeled. In such a solution, represented in FIG. 2, the downgoing 5 and upgoing 6 phases of the heat transfer fluid in the subsoil are dissociated in order to avoid the short circuit at the wellhead and to improve heat exchange. Ideally, the upgoing part of the tube is thermally insulated.

The installation can be done with the technique of diaphragm walls, the trench being made using a hammer-grab. Once the depth has been reached, a first tube is installed then covered with 5 meters of concrete whose thermal conductivity is greater than or equal to 2 W/m·K then a second tube is installed and so on until the number of tubes planned.

Optionally, in one embodiment not represented, the geometry of the optimized probes includes two concentric tubes, one being located inside the other, forming a cylindrical channel and an annular channel around the cylindrical channel: the fluid goes down through the annular channel, an external area in contact with the rock to maximize heat exchanges, then the fluid goes up through the central tube made up of thermally insulating material.

In the case of a dry rock fractured along a preferred direction, or in a rock that can be easily fractured along a preferred direction (using for example the radial jetting or particle jet drilling technique), a fractured rock system as represented in FIG. 4, is modeled and integrated into the model.

A fractured rock solution includes an injection well 7 and a production well 8, and a fracture network 9 including a plurality of openings and faults that allow establishing hydraulic communication between the injection well 7 and the production well 8.

Water, whose mineralogy is adapted to the nature of the traversed rock, is injected using a pump into the injection well 7. A sufficient amount of water is recovered in the production well 8. Preferably, at least 80% of the volume of water injected is recovered in the production well 8. This allows in particular improving the efficiency of the device and limiting the environmental impact, because the water used in this case is the network water. A calculation of orders of magnitude shows that water consumptions quickly become greater than the gain in building consumption loads, hence the limitation to 80% return.

The distance between the injection well 7 and the production well 8 is adapted so that the breakthrough time Tp, which is the time necessary for the water leaving the injection well 7 to reach the production well 8, is greater than or equal to a time T1 defined based on:
- the desired temperature deviation between the injection well 7 and the production well 8,
- the distance between the injection well 7 and the production well 8,
- the fracture network 9 (and particularly the average size of the openings),
- the pressure differential applied between the injection well 7 and the production well 8.

Advantageously, each of the solutions previously described in the case of a dry rock is modeled according to the results of steps S1 and S2 if step S1 does not model the phreatic groundwater in the area of interest. Sets using a combination of different solutions can also be modeled.

Case of a "Wet" Rock (Presence of a Phreatic Groundwater)

A solution with probes can again be modeled. It is proposed to use in the presence of phreatic groundwater the technique of the previously described vertical deviated or optimized probes. The step of modeling S1 the subsoil allows taking into account the convection of the water around the probe, in addition to the diffusion, which improves the heat exchange between the heat transfer fluid and the rock.

A solution with wells on groundwater can be modeled. The classic configuration of geothermal energy on groundwater comprises at least two vertical wells (doublet) approximately 100 m apart, a producer well allowing the pumping of water, and an injector well allowing its return to the aquifer A known solution with a deviated well on groundwater can be modeled in which a deviated producer well allows the pumping of water, and an injector well, also possibly deviated, allows its return to the aquifer.

A deviated well solution is in particular envisaged when the thickness of the area of interest is too low to extract water at a flow rate sufficient to meet surface requirements. The exchange surface with the aquifer is increased by setting up a directional drilling for the shallow wells.

The deviation is initiated by the directional spraying of drilling mud in a friable area (technique called jetting technique), either by a physical shutter (tool of the whipstock type or cement plug "kick-off plug"), or by the use of inclined drilling machine (horizontal directional drilling).

The volume of water accessible for the production well being proportional to the length of the drilling passing through the area of interest, the maximum flow rate is multiplied by a factor $1/\cos(\alpha)$, $\alpha$ being the angle of the well with respect to the azimuth (vertical axis) when passing through the aquifer.

The current deviation techniques allow achieving angle variations of 3° every 30 meters. The use of a horizontal drilling machine, for its part, allows starting a drilling with an angle of 80° with respect to the vertical axis. For a well passing through a 10-meter-thick groundwater and whose production would be 10 m³/h with a conventional vertical drilling, a deviated well drilling allows increasing the production to reach approximately 60 m³/h.

Preferably, each of the solutions previously described in the case of a wet rock is modeled according to the results of steps S1 and S2 if step S1 models a phreatic groundwater in the area of interest. Sets using a combination of different solutions can also be modeled.

A characteristic value can be attributed to each of the solutions described previously: the linear power Pl describes the quantity of resource in the subsoil; it can be continuous, as in the case of a probe (for example 50 W/m), or discrete, as in the case of a well on aquifer (phreatic groundwater) which only delivers the expected power if its depth is reached.

For each solution, the power P exploitable by the installation is equal to the linear power Pl multiplied by the drilling length L (P=Pl*L).

Single-Solution Installation:

Knowing the maximum required power Pbat to maintain the building to its heating or cooling setpoint temperature, a single-solution installation is evaluated by calculating the drilling length L necessary to satisfy the power requirements, based on the linear power Pl1 of each modeled solution.

The model determines the minimum drilling length L1 of the geothermal solutions of each of the modeled installations so that the power delivered is equal to the required power Pbat for the building (Pbat=P=Pl1*L1).

Two-Solution Installation:

In an installation comprising a combination of two geothermal solutions, all the combinations of two well geometries are modeled and simulated.

The model determines the two minimum drilling lengths (L1 and L2) of the geothermal solutions of each of the installations modeled so that the sum of the powers delivered is equal to the required power Pbat for the building (Pbat=P=Pl1*L1+Pl2*L2).

Three-Solution Installation:

In an installation comprising a combination of three geothermal solutions, all the combinations of three well geometries are modeled and simulated.

The model determines the three minimum lengths (L1, L2 and L3) of the probes of the geothermal solutions of each of the installations modeled so that the sum of the powers delivered is equal to the required power Pbat for the building (Pbat=P=Pl1*L1+Pl2*L2+Pl3*L3).

Using the same optimization scheme, solutions combining four or more geothermal solutions of similar types or not can be envisaged.

Preferably, the maximum drilling length of a solution is less than 500 m. Depending on this limit, a maximum exploitable power Pmax of the subsoil is estimated and compared to the needs of the building Pbat. If the maximum exploitable power Pmax of the subsoil is greater than the needs of the building Pbat, a network geothermal potential can then be estimated. A geothermal network can then be envisaged between different buildings close to the area of interest, ideally having different and complementary typologies and needs.

Determination of a Preferred Model

In order to be able to determine which geometry is optimum in the considered case, a complexity index C is associated with each of them.

The complexity index can be a multi-criteria index (vector index).

The criteria can, depending on the needs and constraints of the decision-maker, be chosen from the examples of the following (non-exhaustive) list: carbon footprint (global warming indicator), financial cost, impact on biodiversity (GBS "Global Diversity Score" indicator for example (as presented in the publication "Les cahiers de la biovid'2050"—March 2019—http://www.mission-economie-biodiversite.com/publication/gbs-update-2018)), soil and water acidification, depletion of abiotic resources, air or water pollution, eutrophication, depletion of the ozone layer, photochemical ozone formation, primary energy use, waste generation.

The complexity index also takes into account not only the installation part, but also, where applicable, the entire life cycle of the geo-energy installation and of the building. It can thus then be composed of a part independent of the duration of use (installation and end of life) and a part dependent of the duration of use (implementation/operation).

Example of Complexity: Carbon Impact

Let's consider a 7,800 m² building that consumes 53 MWh of energy for its heating and air conditioning. A geoenergy installation can be set up, requiring the drilling of two wells.

The design, drilling of wells, materials, transport and operation of men and machines, as well as site waste are taken into account to measure a carbon cost of the installation at 33 tons of $CO_2$.

The creation of heat and cold by geoenergy generates electricity consumption. By taking the electricity emission factor in the French energy mix, it is estimated that 4.5 tons of $CO_2$ are emitted annually for the heating and the air conditioning.

Thus, after 25 years of operation, the full carbon footprint will be 33+4.5*25=145.5 tons of $CO_2$.

The reference solution has no fixed part (installation already in place); as a replacement, its operation generates 33.8 tons of $CO_2$ annually. After 25 years, the $CO_2$ emissions related to the heating and air conditioning of this building would be 33.8*25=845 tons $CO_2$.

Linear Complexity

A characteristic value can be attributed to each of the solutions described previously: the linear complexity CI reflects the technical difficulty in implementing the solution envisaged. This magnitude takes into account the access to the site (surface available for drilling, access for the drilling machine), the depth of the wells, the quality of the ground, as well as different potential sources of technical problems hindering the construction of the installation.

For each solution, the complexity C is equal to the linear complexity CI of the solution multiplied by the drilling length L (C=CI*L).

Optionally, if renovation work on the building is envisaged, a complexity of implementation is associated therewith (taking into account the availability of the building and the quantity of work to be performed). The optimization of the geothermal solution is reiterated by replacing the needs of the building Pbat by its theoretical needs Pth(i). The complexity calculation of the geothermal solution is again calculated on this fictitiously renovated building.

In the embodiments in which building renovation work is envisaged, the complexity C therefore further includes a complexity term Cb(i) from the work to be carried out (C=CI*L+Cb(i)).

Knowing the installations modeled during step S3, and therefore the minimum drilling lengths that allow meeting the needs of the building, the complexity of each modeled solution is calculated during a step S41.

The different possible options are then classified during a step S42 according to the complexity of the implementation and the model recommends the most reasonable option, that is to say the installation having the lowest index of complexity C.

Thus, the method identifies an optimal solution among the plurality of possible modeled solutions, which allows proposing an installation adapted to the needs of the building and to the nature of the soil, while proposing the technically simplest solution, which limits the sources of errors on the site, and the duration of the site.

Preferably, prior to the step S41 of calculating the complexity of each solution, a step S40 of evaluating the technical feasibility of the solution is carried out.

During step S40, each installation is evaluated and considered feasible or excluded.

If an installation is considered as excluded, it is removed from the potentially achievable models. The complexity of an excluded solution is not calculated, and the solution is therefore not classified. This allows limiting the calculation time of steps S41 and S42, and therefore the resources necessary for their execution.

A solution is in particular excluded if the theoretical length of the probes is greater than 500 m or, for a single-solution installation on groundwater, if the accessible groundwater does not meet the needs of the building.

Depending on the different types of installations, and in particular on the number of geothermal solutions of the installations, the complexity index C can be calculated in different ways.

Single-Solution Installation:

Knowing the minimum length L1 necessary to maintain the building to its heating or cooling setpoint temperature estimated in step S3, the complexity C of each solution is then calculated as the product of the linear complexity CI of the solution multiplied by the minimum length L1 of probes estimated in step S3.

Preferably, prior to calculating the complexity of each solution, an evaluation step S40 is carried out.

Two-Solution Installation:

In an installation comprising a combination of two geothermal solutions, all the combinations of two well geometries are modeled and simulated.

The complexity C is then calculated by summing the complexities of each of the geothermal solutions and adding a penalty M (C=CI1*L1+CI2*L2+M) thereto.

Preferably, prior to calculating the complexity of each solution, an evaluation step S40 is carried out. An installation is excluded if one of its solutions has a minimum length L1, L2 of probes greater than 500 m or if the accessible groundwater does not meet the needs of the building.

Three-Solution Installation:

In an installation comprising a combination of three geothermal solutions, all the combinations of three well geometries are modeled and simulated.

The complexity C is then calculated by summing the complexities of each of the geothermal solutions and adding a penalty M (C=CI1*L1+CI2*L2+CI3*L3+M) thereto.

Preferably, prior to calculating the complexity of each solution, an evaluation step S40 is carried out. An installation is excluded if one of its solutions has a minimum length L1, L2, L3 of probes greater than 500 m or if the accessible groundwater does not meet the needs of the building.

The penalty M increases with the number of solutions implemented in the envisaged installation, and increases all the more as the solutions implemented in the installation call upon different techniques and tools.

Preferably, for reasons of complexity and optimization between the systems, the simulated installations comprise three solutions or less. Indeed, beyond that, the penalty M becomes statistically dissuasive and such types of installations are not competitive with types of installations comprising three solutions or less, even if they are energy efficient. The fact of limiting the number of solutions per installation allows reducing the time and difficulty of the model generation S3 and preferential model determination S4 steps.

By avoiding over-dimensioning the geothermal installations in relation to the needs of the building, such a method for assisting in making the geothermal installation also allows reducing the perimeters of exclusion around the installations. Indeed, conventionally, a perimeter is established around a geothermal installation, inside which it is forbidden to build another geothermal installation. This perimeter is defined in particular according to the power of the installation and to the geothermal potential of the area. A more suitable dimensioning of the geothermal installations therefore allows minimizing the exclusion perimeters, and therefore increasing the potential number of geothermal installations of a geographical area.

At the end of the method for assisting in making the geothermal installation, the latter is built according to the model proposed by the method using the conventional construction and drilling methods.

The invention claimed is:

1. A method for modeling a geothermal installation for the thermal regulation of at least one building, wherein, by means of a computing unit, the following steps are implemented:
    S1: Modeling of a geothermal potential of one area of interest comprising a subsoil area comprised in a given perimeter around the building;
    S2: Estimation of the thermal needs of the building so as to identify a dimensioning parameter representing the maximum value of the required power (Pbat) to maintain the building to heating or cooling setpoint temperature of the building;
    S3: Generation of a plurality of models of geothermal installations according to the results of S1 and S2, a model of geothermal installation comprising one or several geothermal solutions configured so as to meet the needs estimated in step S2 according to the area of interest modeled in step S1;
    S4: Application of a selection criterion configured to determine a preferential model, step S4 comprising a step of calculating a complexity index S41 associated with each model of geothermal installation of the plurality of models of geothermal installation, and a ranking step S42 configured to classify the plurality of models of geothermal installation according to their respective complexity index; wherein step S1 is carried out so as to obtain a three-dimensional geological map of the geological nature of the subsoil by executing the following sub-steps:
    S11: Interpolation of a geological surface map with geological cross-sections performed occasionally, so as to statistically associate a subsoil profile with a type of geological surface;
    S12: Modeling of the subsoil in a given perimeter around the building according to the surface, from the statistical associations obtained in step S11;
    a model of geothermal installation thus selected being intended to be used for making a geothermal installation.

2. The method according to claim 1, wherein step S2 is further configured to generate a plurality of models of the building, each of the models integrating modifications so as to simulate the effect of renovation work on the building, a dimensioning parameter representing the theoretical need (Pth (i)) then being identified for each of the previously generated models of the building.

3. The method according to any of claims 1 to 2, wherein step S3 is configured to generate the plurality of models of geothermal installations, each model of geothermal installation of the plurality of models of geothermal installation including one or several geothermal solutions, the geothermal solutions being chosen according to the nature of the subsoil of the area of interest modeled in step S1.

4. The method according to claim 3, wherein each model of geothermal installation of the plurality of models of geothermal installations include a maximum of three geothermal solutions.

5. The method according to claim 3, wherein the geothermal solutions are chosen, for a dry soil, among vertical probes, deviated probes, optimized probes, a solution with fractured rock including an injection well (5) and a production well (6) and a fracture network (7) including a plurality of openings and faults that allow establishing fluid communication between the injection well (5) and the production well (6), and for a wet soil, among a solution with vertical, deviated, optimized probes, a solution with well on groundwater, a solution with deviated well on groundwater.

6. The method according to claim 3 in combination with any of claims 1 and 2, wherein the modeled geothermal installations are dimensioned such that the drilling length of each modeled installation allows producing the required power to meet the dimensioning parameter (Pbat, Pth(i)) according to the geothermal potential of the subsoil modeled in step S1.

7. The method according to claim 1, wherein step S4 includes an evaluation step S40, during which each modeled installation is evaluated and considered as feasible or excluded, any excluded installation being removed from the potentially achievable models.

8. The method according to claim 7, wherein step S40 is carried out before steps S41 and S42.

9. The method according to claim 1, characterized in that a complexity index is a multi-criteria index.

10. The method according to claim 1, characterized in that a complexity index is composed of a part independent of the duration of use, taking into account the installation and the end of life of the geothermal installation and of the building, as well as a part independent of the duration of use.

11. A method wherein the modeling is re-evaluated later by implementing the steps of method according to claim 1.

12. A method for making a geothermal installation, wherein the geothermal installation is made according to a determined model by implementing a method for modeling a geothermal installation for the thermal regulation of at least one building, wherein, by means of a computing unit, the following steps are implemented:
- S1: Modeling of a geothermal potential of one area of interest comprising a subsoil area comprised in a given perimeter around the building;
- S2: Estimation of the thermal needs of the building so as to identify a dimensioning parameter representing the maximum value of the required power (Pbat) to maintain the building to heating or cooling setpoint temperature of the building;
- S3: Generation of a plurality of models of geothermal installations according to the results of S1 and S2, a model of geothermal installation comprising one or several geothermal solutions configured so as to meet the needs estimated in step S2 according to the area of interest modeled in step S1;
- S4: Application of a selection criterion configured to determine a preferential model, step S4 comprising a step of calculating a complexity index S41 associated with each model of geothermal installation of the plurality of models of geothermal installation, and a ranking step S42 configured to classify the plurality of models of geothermal installation according to their respective complexity index;

wherein step S1 is carried out so as to obtain a three-dimensional geological map of the geological nature of the subsoil by executing the following sub-steps:
- S11: Interpolation of a geological surface map with geological cross-sections performed occasionally, so as to statistically associate a subsoil profile with a type of geological surface;
- S12: Modeling of the subsoil in a given perimeter around the building according to the surface, from the statistical associations obtained in step S11;

a model of geothermal installation thus selected being intended to be used for making a geothermal installation.

13. A computer program product including code instructions for implementing steps of a method for modeling a geothermal installation for the thermal regulation of at least one building, wherein, by means of a computing unit, the following steps are implemented:
- S1: Modeling of a geothermal potential of one area of interest comprising a subsoil area comprised in a given perimeter around the building;
- S2: Estimation of the thermal needs of the building so as to identify a dimensioning parameter representing the maximum value of the required power (Pbat) to maintain the building to heating or cooling setpoint temperature of the building;
- S3: Generation of a plurality of models of geothermal installations according to the results of S1 and S2, a model of geothermal installation comprising one or several geothermal solutions configured so as to meet the needs estimated in step S2 according to the area of interest modeled in step S1;
- S4: Application of a selection criterion configured to determine a preferential model, step S4 comprising a step of calculating a complexity index S41 associated with each model of geothermal installation of the plurality of models of geothermal installation, and a ranking step S42 configured to classify the plurality of models of geothermal installation according to their respective complexity index;

wherein step S1 is carried out so as to obtain a three-dimensional geological map of the geological nature of the subsoil by executing the following sub-steps:
- S11: Interpolation of a geological surface map with geological cross-sections performed occasionally, so as to statistically associate a subsoil profile with a type of geological surface;
- S12: Modeling of the subsoil in a given perimeter around the building according to the surface, from the statistical associations obtained in step S11;

a model of geothermal installation thus selected being intended to be used for making a geothermal installation, wherein said program is executed on a computer.

\* \* \* \* \*